United States Patent
Liu et al.

(10) Patent No.: US 11,552,527 B2
(45) Date of Patent: Jan. 10, 2023

(54) PACKING AND MOUNTING MECHANISM FOR ELECTRIC MOTOR IN SMALL AND MEDIUM-SIZED APPLIANCES

(71) Applicant: Skybest Electric Appliance (Suzhou) Co., Ltd., Suzhou (CN)

(72) Inventors: Haiping Liu, Suzhou (CN); Feng Wang, Suzhou (CN); Zhao Kong, Suzhou (CN); Liang Xia, Suzhou (CN)

(73) Assignee: SKYBEST ELECTRIC APPLIANCE (SUZHOU) CO., LTD., Suzhou (CN)

( * ) Notice: Subject to any disclaimer, the term of this patent is extended or adjusted under 35 U.S.C. 154(b) by 294 days.

(21) Appl. No.: 16/639,348

(22) PCT Filed: Aug. 15, 2018

(86) PCT No.: PCT/CN2018/100643
§ 371 (c)(1),
(2) Date: Feb. 14, 2020

(87) PCT Pub. No.: WO2019/034079
PCT Pub. Date: Feb. 21, 2019

(65) Prior Publication Data
US 2021/0135537 A1 May 6, 2021

(30) Foreign Application Priority Data

Aug. 15, 2017 (CN) .......................... 201710696343.X
Aug. 15, 2017 (CN) .......................... 201710696602.9
Aug. 15, 2017 (CN) .......................... 201710696963.3

(51) Int. Cl.
*H02K 5/24* (2006.01)
*H02K 5/10* (2006.01)

(52) U.S. Cl.
CPC .................. *H02K 5/24* (2013.01); *H02K 5/10* (2013.01)

(58) Field of Classification Search
CPC ............ H02K 5/24; H02K 5/10; H02K 5/132; H02K 5/26; A47L 7/0042; A47L 7/0019; A47L 7/0004

(Continued)

(56) References Cited

U.S. PATENT DOCUMENTS 2,000,386 A * 5/1935 Haynes ..................... H02K 5/24
416/246
2,510,130 A * 6/1950 Moore .................. H02K 5/132
277/428

(Continued)

FOREIGN PATENT DOCUMENTS

CN 104997463 A * 10/2015
CN 104997463 A 10/2015

(Continued)

OTHER PUBLICATIONS

CN-104997463-A (English translation) (Year: 2015).*
International Search Report for Application No. PCT/CN2018/100643, dated Nov. 6, 2018.

*Primary Examiner* — Maged M Almawri
(74) *Attorney, Agent, or Firm* — JK Intellectual Property Law, PA

(57) ABSTRACT

A motor packing and mounting mechanism for a motor in a no larger than medium-sized appliance, such as wet and dry vacuum cleaner, a water aspirator, a water pump, or a humidifier, includes a motor seat supporting a motor in a housing so that the motor is axially disposed between the housing and the motor seat. At least one isolating cover is located inside the housing. A motor chamber for receiving the motor is defined among the housing, the motor seat, and the isolating cover. An axial mating clearance is defined between the isolating cover and the motor seat. A first seal is located and axially-mated in the axial mating clearance, the first seal having an elastic supporting portion. A cross section of the elastic supporting portion has a door-shaped structure, with the elastic supporting portion defining an opening facing an axial direction of the motor.

15 Claims, 11 Drawing Sheets

(58) Field of Classification Search
USPC .............................. 310/51, 85, 87, 88, 89, 91
See application file for complete search history.

(56) References Cited

U.S. PATENT DOCUMENTS

| | | | | |
|---|---|---|---|---|
| 3,491,695 | A * | 1/1970 | Blum | H02K 5/132 |
| | | | | 417/63 |
| RE26,783 | E * | 2/1970 | Boyd | H02K 5/132 |
| | | | | 310/90 |
| 4,377,763 | A * | 3/1983 | Drake | H02K 5/132 |
| | | | | 310/112 |
| 4,797,072 | A * | 1/1989 | Berfield | A47L 7/0028 |
| | | | | 15/329 |
| 2002/0117908 | A1* | 8/2002 | Sanchez | H02K 11/33 |
| | | | | 310/89 |
| 2013/0088106 | A1* | 4/2013 | Bitzer | H02K 5/10 |
| | | | | 310/71 |
| 2015/0132158 | A1* | 5/2015 | Reeves | F04D 13/0653 |
| | | | | 417/410.1 |
| 2017/0225707 | A1* | 8/2017 | Tomizawa | B62D 5/0424 |
| 2019/0074748 | A1* | 3/2019 | Le Goff | H02K 5/24 |
| 2020/0343793 | A1* | 10/2020 | Söhnle | H02K 11/33 |

FOREIGN PATENT DOCUMENTS

| | | | | |
|---|---|---|---|---|
| CN | 107863834 | A | 3/2018 | |
| CN | 107863835 | A | 3/2018 | |
| CN | 107863836 | A | 3/2018 | |
| EP | 2241760 | A2 * | 10/2010 | ........... F04D 29/083 |
| JP | 2002364589 | A | 12/2002 | |

* cited by examiner

PACKING AND MOUNTING MECHANISM FOR ELECTRIC MOTOR IN SMALL AND MEDIUM-SIZED APPLIANCES

CROSS-REFERENCE TO RELATED PATENT APPLICATIONS

This application is a national stage of International Application No. PCT/CN2018/100643, filed on Aug. 15, 2018, which claims priority to CN Patent Application No. 201710696343.X, filed on Aug. 15, 2017, CN Patent Application No. 201710696602.9, filed on Aug. 15, 2017, and CN Patent Application No. 201710696963.3, filed on Aug. 15, 2017. All of the aforementioned applications are hereby incorporated by reference in their entireties.

TECHNICAL FIELD

The present disclosure relates to a mounting mechanism for a motor in an appliance, in particular to a waterproof packing and mounting mechanism for a motor in a small or medium-sized appliance.

BACKGROUND

An electric motor is commonly known as a motor, which refers to an electromagnetic device for converting or transmitting electrical energy according to the law of electromagnetic induction, and mainly functions to generate a driving torque as a power source of an appliance or various machines.

The mounting of the motor in the appliance needs to consider two aspects: one is fixing of the motor, which needs to prevent the start-up following rotation of the series-excited motor, so that the motor is fixed during normal operation; and the other is sealing, which prevents liquid such as water from entering a motor chamber during the use of the appliance to cause damage to the motor. In particular, small and medium-sized appliances of water sucking types have higher requirements for water proofing of motors. In the prior art, motors in such appliances are generally sealed and fixed by soft seals on the upper and lower sides, which achieve axial crimping fixation on the motors, so the sealing effect on the motors depends on the axial pressing force. Generally, in order to fix a motor firmly, the axial pressure is often large, and the soft seals lose elasticity after being pressed and cannot absorb the vibration of the motor during operation, so the noise is large; in addition, the large axial pressure easily causes damage to the soft seals, resulting in bad effects such as seal failure.

In the prior art, the sealing structures of motors in small and medium-sized appliances such as wet and dry vacuum cleaners are relatively simple, and are all simply sealed by axial pressure seals, so the waterproof performance is poor. The sealing effect depends entirely on the amount of axial pressure, and the sealing performance is inversely proportional to the noise absorption capability of the seals under pressure, that is, if the better the sealing performance is, the worse noise the reduction capability is.

SUMMARY

The present disclosure aims to provide a packing and mounting mechanism for a motor in a small or medium-sized appliance, and the packing and mounting mechanism has strong noise absorption and noise reduction capability.

In order to achieve one of the above objectives of the present disclosure, an embodiment of the present disclosure provides a packing and mounting mechanism for a motor in a small or medium-sized appliance, including a housing, a motor in the housing, and a motor seat supporting the motor, wherein at least one isolating cover is provided inside the housing, the motor is axially disposed between the housing and the motor seat, a motor chamber for receiving the motor is formed among the housing, the motor seat and the isolating cover, an axial mating clearance is formed between the isolating cover and the motor seat, a axially-mated first seal is provided in the axial mating clearance, the first seal has an elastic supporting portion, the cross section of the elastic supporting portion is of a door-shaped structure, and the elastic supporting portion has an opening facing the axial direction of the motor.

As a further improvement on the embodiment of the present disclosure, the first seal has an inner side wall, an outer side wall opposite to the inner side wall and having a certain distance from the inner side wall, and a top wall for connecting the inner side wall and the outer side wall, and the inner side wall, the outer side wall, and the top wall constitute the door-shaped structure having an opening.

As a further improvement on the embodiment of the present disclosure, the top wall has a radian away from the opening.

As a further improvement on the embodiment of the present disclosure, the motor seat is provided with a mounting groove, the first seal is disposed in the mounting groove, the motor seat further includes an inner flange, an outer flange opposite to the inner flange and a bottom portion between the inner flange and the outer flange, the inner flange, the bottom portion and the outer flange constitute the mounting groove, the opening of the door-shaped portion faces the bottom portion, the inner side wall abuts against the inner flange, the outer side wall abuts against the outer flange, and the top wall abuts against the isolating cover.

As a further improvement on the embodiment of the present disclosure, a first isolating cover and a lower cover are provided inside the housing, the first isolating cover is disposed on the radial periphery of the motor, the lower cover is disposed on the lower part and radial periphery of the motor seat, the motor chamber is formed among the housing, the motor seat and the first isolating cover, an outer chamber isolated from the motor chamber is formed among the motor seat, the first isolating cover and the lower cover, and the axial mating clearance is between the first isolating cover and the motor seat.

As a further improvement on the embodiment of the present disclosure, a radial mating clearance is also formed between the first isolating cover and the motor seat, the first seal includes a first sealing portion in the radial mating clearance and a second sealing portion in the axial mating clearance, and the elastic supporting portion is disposed on the second sealing portion.

As a further improvement on the embodiment of the present disclosure, the second sealing portion is at least partially exposed from the motor chamber, and the first sealing portion is a sealing mechanism having adaptive deformation according to the change in air pressure of the outer chamber.

As a further improvement on the embodiment of the present disclosure, the first sealing portion is a lip-shaped sealing portion.

As a further improvement on the embodiment of the present disclosure, a sealing gasket is provided between the first isolating cover and the lower cover, the first isolating cover has a first isolating cover inner edge and a first isolating cover outer edge, the lower cover has a peripheral portion on the periphery of the motor seat and an end portion on the axial end face of the motor seat, the peripheral portion is provided with a receiving groove for receiving the sealing gasket, and the first isolating cover outer edge abuts against the sealing gasket.

As a further improvement on the embodiment of the present disclosure, a second seal is provided between the motor seat and the lower cover, the second seal has a seal side wall and a bottom wall, the seal side wall is disposed on the periphery of the motor seat, the seal side wall is between the motor seat and the peripheral portion of the lower cover, and the bottom wall is between an end face of the motor seat and an end portion of the lower cover.

As a further improvement on the embodiment of the present disclosure, the seal side wall is corrugated, the bottom wall has a bottom edge connected to the side wall and an inner edge connected to the bottom edge, the seal side wall has a connecting end connected to the bottom edge and a free end opposite to the connection end, and the inner edge is closer to the free end than the bottom edge in the vertical direction.

As a further improvement on the embodiment of the present disclosure, the inner edge extends obliquely from the connection point with the bottom edge toward an end portion of a second isolating cover, the end portion of the second isolating cover is provided with at least one abutting portion abutting against the inner edge, the end portion of the second isolating cover is also provided with a protruding portion abutting against the bottom edge, and other portion of the end portion of the second isolating cover except the protruding portion has a certain distance from the bottom edge.

As a further improvement on the embodiment of the present disclosure, a second seal is provided between the isolating cover and the motor seat, and the packing and mounting mechanism further includes a follow-up rotation preventing structure for preventing other parts of the motor except a rotor, the motor seat, and the second seal from rotating; the follow-up rotation preventing structure includes a first mating portion disposed on the isolating cover, a second mating portion disposed on the second seal, and a third mating portion disposed on the motor seat, wherein every two of the first mating portion, the second mating portion, and the third mating portion are mated with each other.

As a further improvement on the embodiment of the present disclosure, the first mating portion is a positioning groove, the second mating portion is a positioning protrusion with a straight positioning convex slot, and the third mating portion is a fixed protrusion extending toward the periphery of the motor seat, the fixed protrusion being mated with the positioning convex slot, the positioning protrusion being mated with the positioning groove.

As a further improvement on the embodiment of the present disclosure, a third seal is provided between the housing and the motor, the third seal has a vertical edge and at least one lip edge disposed at an angle to the vertical edge, the lip edge and the vertical edge form a third lip opening, the vertical edge is disposed on the periphery of the motor and abuts against the periphery of the motor, the lip edge abuts against the housing, and the third lip opening faces the motor chamber.

As a further improvement on the embodiment of the present disclosure, the motor seat has a mounting portion, the mounting portion has a first side and a second side opposite to the first side, the motor is disposed on the first side, a static impeller is disposed on the second side, the motor has an output shaft, a dynamic impeller is disposed on the output shaft, and the static impeller is on the periphery of the dynamic impeller.

As a further improvement on the embodiment of the present disclosure, the small or medium-sized appliance is a wet and dry vacuum cleaner, a water aspirator, a water pump, or a humidifier.

Compared with the prior art, the present disclosure has the beneficial effects: the first seal has an elastic supporting portion, the cross section of the elastic supporting portion is of a door-shaped structure, and the elastic supporting portion has an opening facing the axial direction of the motor. In this way, the first seal plays a supporting role and has good elasticity. The first seal is elastically deformed by an axial force to achieve a sealing function, so that the packing and mounting mechanism has strong noise absorption and noise reduction capability.

DETAILED DESCRIPTION OF EMBODIMENTS

The present disclosure will be described in detail below with reference to specific embodiments shown in the accompanying drawings. However, these embodiments do not limit the present disclosure. Structures, methods, or functional transformations made by those of ordinary skill in the art based on these embodiments are all included within the protection scope of the present disclosure.

Figure 1:
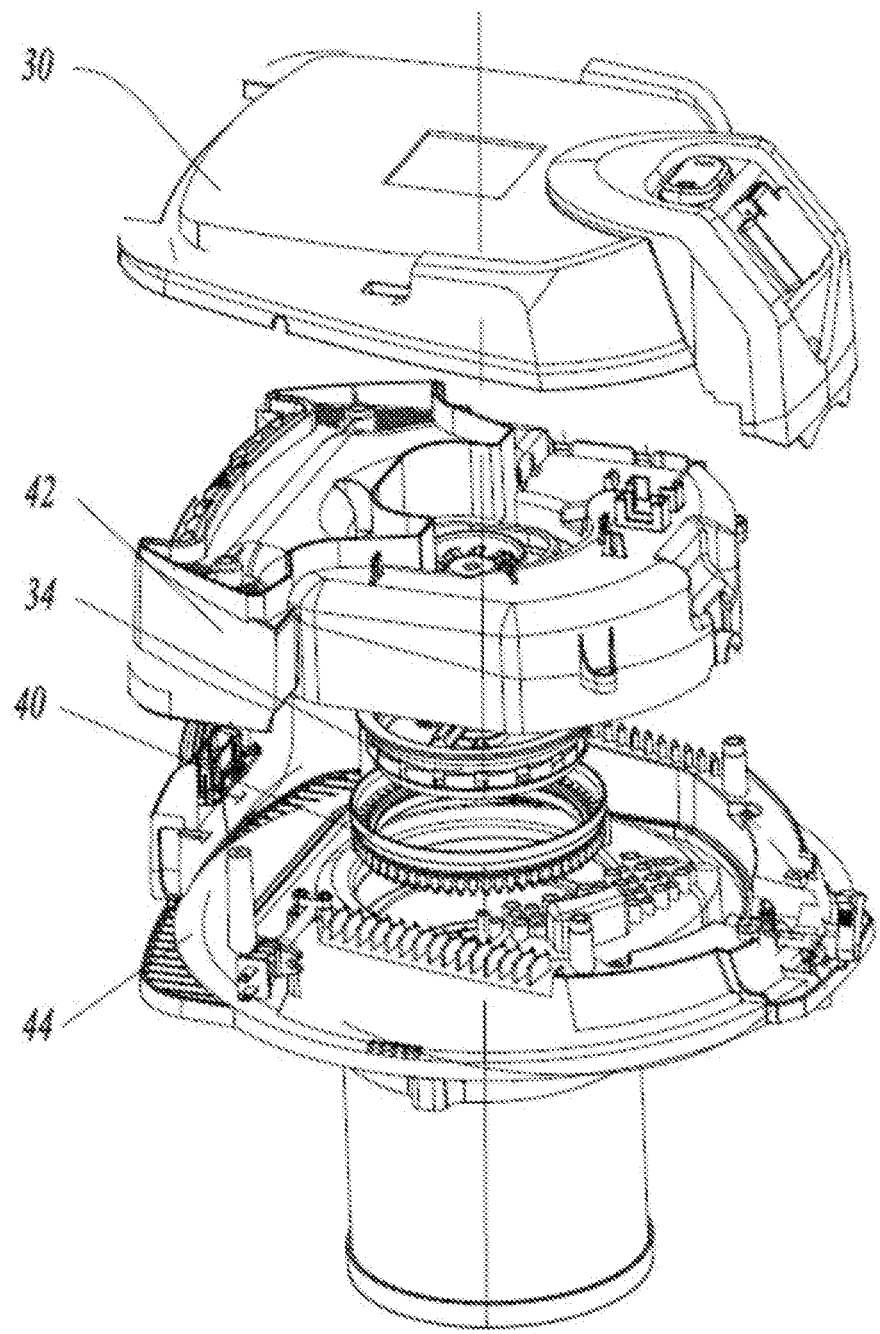
FIG. 1 is an exploded isometric view of a wet and dry vacuum cleaner having a packing and mounting mechanism according to a first preferred embodiment of the present disclosure.

A first preferred embodiment of the present disclosure provides a packing and mounting mechanism for a motor in a small or medium-sized appliance. FIG. 1 is an exploded structure diagram of a wet and dry vacuum cleaner having a packing and mounting mechanism, which includes a housing 30, a motor 32 in the housing 30, and a motor seat 34 supporting the motor 32. Specifically, the bottom of the motor 32 is fixedly connected to the motor seat 34. The packing and mounting mechanism is used to suspend, fix and effectively isolate the motor 32 in the housing 30, thereby preventing water or vapor from damaging the motor 32 and its accessories, and reducing the noise of the motor 32 during operation.

Specifically, at least one isolating cover is provided inside the housing 30, and the motor 32 is axially disposed between the housing 30 and the motor seat 34. The motor seat 34, the housing 30, and the isolating cover collectively form a motor chamber 36 for receiving the motor 32. In addition, a sealed end of the motor chamber 36 has a radial mating clearance 38, and a radially-mated first seal 40 is provided in the mating clearance 38. The sealed end refers to a joint between the motor seat and the isolating cover, so as to realize sealed docking. The first seal 40 is elastically deformed by a radial force to achieve a sealing function, and its sealing performance is independent of the axial pressure of the motor, so the first seal 40 does not lose its elasticity under large axial pressure, and has strong noise absorption and noise reduction capability.

Further, the first seal 40 includes at least one sealing portion, and the sealing portion is a sealing mechanism having adaptive deformation according to the change in air pressure difference between the inside and outside of the motor chamber. More specifically, the sealing portion is a lip-shaped sealing portion. The sealing portion includes a main lip, a sub lip, and a lip opening formed by the main lip and the sub lip. The lip opening faces the outside of the motor chamber. The isolating cover and the motor seat 34 also form an outer chamber isolated from the motor chamber 36, and the sealing portion is adaptively deformed with the change in air pressure of the outer chamber.

Figure 2:
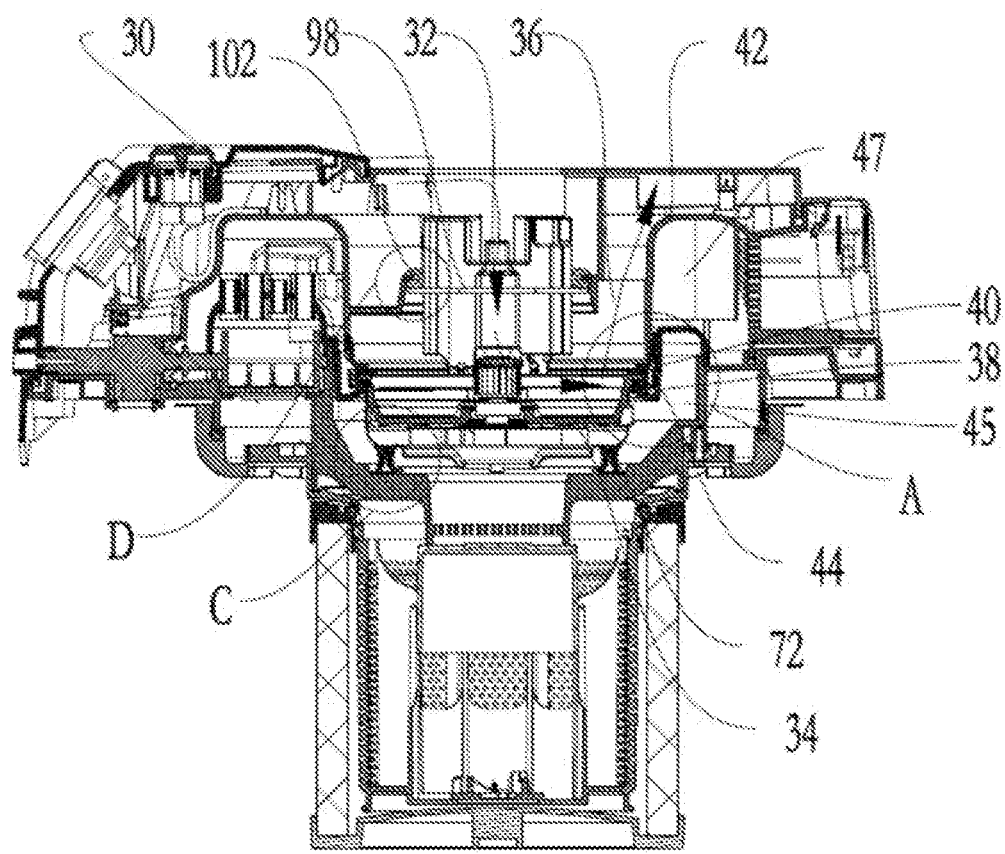
FIG. 2 is a side cross-sectional view of the wet and dry vacuum cleaner having the packing and mounting mechanism according to the first preferred embodiment of the present disclosure.

Specifically, as shown in FIG. 2, a first isolating cover 42 and a second isolating cover 44 are provided inside the housing 30, the first isolating cover 42 is disposed on the radial periphery of the motor 32, and the second isolating cover 44 is disposed on the radial periphery of the motor seat 34. A motor chamber 36 for receiving the motor is formed among the housing 30, the motor seat 34 and the first isolating cover 42, the sealed end of the motor chamber 36 has a radial mating clearance 38, and a radially-mated first seal 40 is disposed in the mating clearance 38. The sealed end refers to the joint of the motor seat with the first isolating cover and the second isolating cover, so as to realize sealed docking. The first seal 40 is elastically deformed by a radial force for sealing, and its sealing performance is independent of the axial pressure of the motor, so the first seal 40 does not lose its elasticity under large axial pressure, and has strong noise absorption and noise reduction capability.

Figure 3:
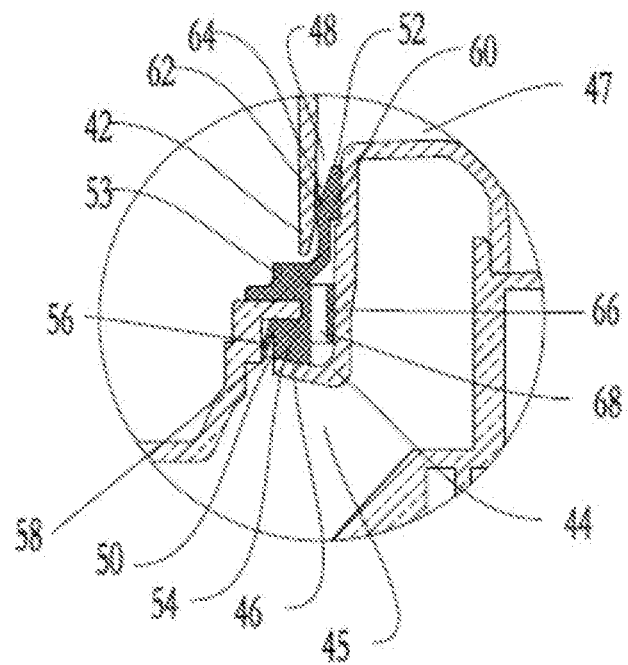
FIG. 3 is an enlarged cross-sectional view of area A in FIG. 2.
Figure 4:
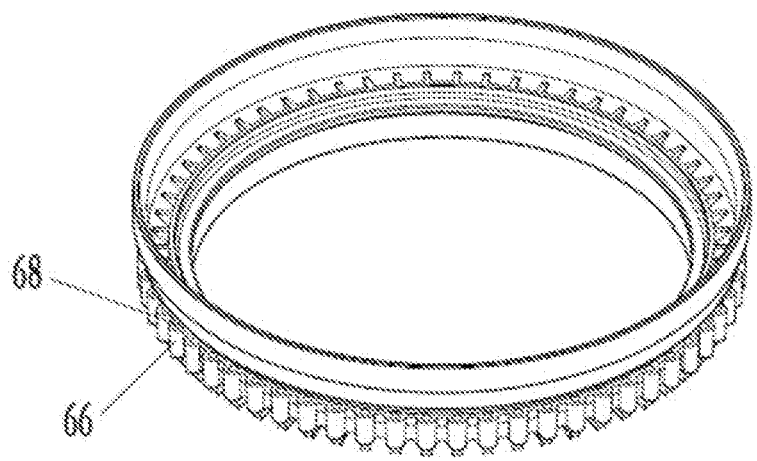
FIG. 4 is an isometric view of the first seal in FIG. 2.
Figure 5:
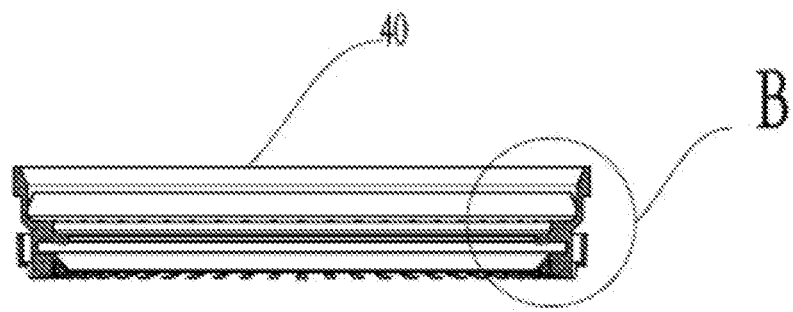
FIG. 5 is a side cross-sectional view of the first seal in FIG. 4.
Figure 6:
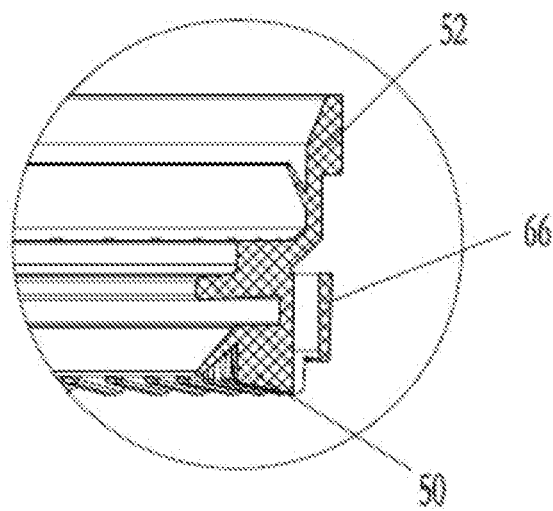
FIG. 6 is an enlarged cross-sectional view area B in FIG. 5.

As shown in FIG. 2 and FIG. 3, specifically, a first outer chamber 45 is formed between the motor seat 34 and the second isolating cover 44, and a second outer chamber 47 is formed between the first isolating cover 42 and the second isolating cover 44. Further, a first mating clearance 46 is formed between the motor seat 34 and the second isolating cover 44, a second mating clearance 48 is formed between the first isolating cover 42 and the second isolating cover 44, and the first seal 40 is in the first mating clearance 46 and the second mating clearance 48. The motor seat 34, the first seal 40 and the second isolating cover 44 together form the first outer chamber 45, and the second isolating cover 44, the first seal 40 and the first isolating cover 42 together form the second outer chamber 47. Moreover, in this preferred embodiment, a J-shaped edge of the second isolating cover 44 facilitates the formation of the mating clearance. Of course, the J-shaped edge may also be adopted for the first isolating cover 42.

Specifically, the first seal 40 includes a first sealing portion 50 in the first mating clearance 46 and/or a second sealing portion 52 in the second mating clearance 48. Only one sealing portion is needed to achieve sealing. In the preferred embodiment, the first sealing portion and the second sealing portion are used at the same time to enhance the sealing effect. The motor chamber 36 is isolated from the first outer chamber 45 and the second outer chamber 47 by the first seal 40 to prevent water from entering the motor chamber along the matching clearances, thereby effectively protecting the motor and its accessories.

In this preferred embodiment, the first sealing portion 50 and the second sealing portion 52 are integrally provided, the first seal further includes a connecting portion 53 for connecting the first sealing portion 50 and the second sealing portion 52, and the connecting portion 53 is between the motor seat 34 and the first isolating cover 42. Of course, the first sealing portion 50 and the second sealing portion 52 may also be provided separately, that is, provided as two independent parts.

In view of the above technical solution, the first sealing portion 50 is a sealing mechanism having adaptive deformation according to the change of air pressure in the first outer chamber 45; and the second sealing portion 52 is a sealing mechanism having adaptive deformation according to the change of air pressure in the second outer chamber 47. That is, the sealing performance is adjusted through the change of external pressure. As the air pressure in the outer chambers increases, the sealing effects of the pressure adaptive sealing portions on the mating clearances increase, so the pressure required for the initial assembly is low. By adaptive adjustment based on the air pressure, a long-term high pressure state is avoided, the elastic attenuation of the first seal is retarded, and the service life of the first seal is prolonged. In addition, the second sealing portion 52 is at least partially exposed from the motor chamber.

As shown in FIG. 3 to FIG. 6, the first sealing portion 50 and the second sealing portion 52 are both lip-shaped sealing portions. Specifically, the first sealing portion 50 includes a first main lip 54, a first sub lip 56, and a first lip opening 58 formed by the first main lip 54 and the first sub lip 56, the first lip opening 58 facing the first outer chamber 45; and the second sealing portion 52 includes a second main lip 60, a second sub lip 62, and a second lip opening 64 formed by the second main lip 60 and the second sub lip 62, the second lip opening 64 facing the second outer chamber 47. The lip openings are controlled by the changes of air pressure in the outer chambers. As the air pressure increases, the lip openings become large, the pressure on the connecting portion increases, and the sealing effect is enhanced. Otherwise, as the air pressure decreases, the lip openings become small, the pressure on the connecting portion decreases, and the sealing effect is weakened. Therefore, the function of adaptive pressure adjustment is achieved. Wedge-shaped piston type pressure sealing portions may also be used to change the sealing performance with the changes of air pressure in the chambers.

More specifically, the first main lip 54 abuts against the second isolating cover 44, and the first sub lip 56 abuts against the motor seat 34; the second main lip 312 abuts against the second isolating cover 44, and the second sub lip 62 abuts against the first isolating cover 42. The main lips are thicker than the sub lips, the main lips are mainly used for abutment, the sub lips are mainly used for pressure deformation, the thin sub lips are deformed faster in response to the air pressure and adjusted more smoothly, and the deformed sub lips have large contact surface and strong action with the abutted portions and better sealing effect, thereby effectively preventing water from entering the motor chamber from the sub lips, and guaranteeing the sealing property of the motor chamber.

Preferably, the first seal 40 includes a third elastic portion 66, the third elastic portion 66 is on the side of the first seal 40 facing away from the motor chamber 36, and the third elastic portion 66 abuts against a side wall of the first isolating cover 42 or the second isolating cover 44 to achieve strong elasticity. The third elastic portion 66 increases the assembly stability and noise absorption performance of the first seal 40. More preferably, the third elastic portion 66 has a hollow column 68 for vibration reduction and noise reduction. The hollow column 68 increases the elasticity of the third elastic portion 66 and plays a role in reducing vibration and noise.

Figure 7:
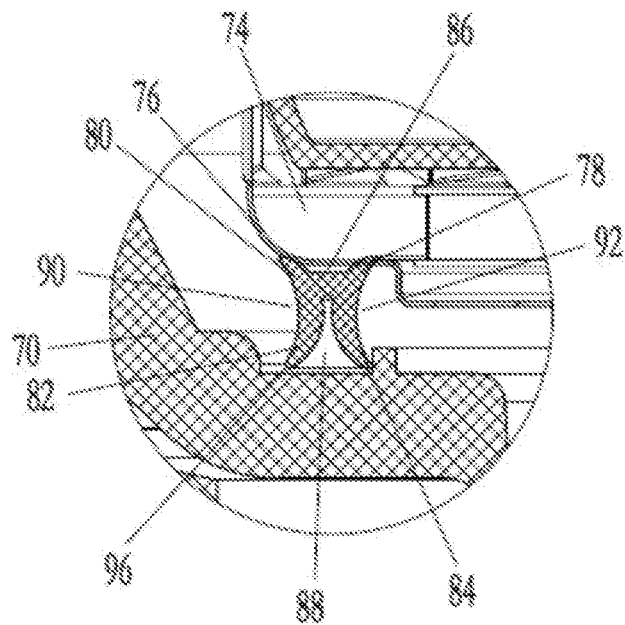
FIG. 7 is an enlarged cross-sectional view of area C in FIG. 2.

As an optimization scheme, as shown in FIG. 7, a lower cover 70 for supporting the motor seat 34 is provided in the housing 30, and a bottom seal ring 72 for flexible sealing is provided between the lower cover 70 and the motor seat 34. It should be noted that the lower cover 70 and the second isolating cover 44 may be independent parts or an integrated part, and are made of the same or different materials. More preferably, an impeller chamber cover 74 is provided at the bottom of the motor seat 34, an impeller chamber 76 is formed between the impeller chamber cover 74 and the motor seat 34, and the bottom seal ring 72 is disposed between the bottom of the impeller chamber cover 74 and the lower cover 70. The bottom seal ring 72 separates the first outer chamber 45 from an air inlet chamber, which indirectly increases the sealing property of the motor chamber 36. It should be noted that the air inlet chamber is an air draft side filtering chamber of the vacuum cleaner. The motor of the vacuum cleaner drives an impeller to rotate to generate suction force. The fluid path is: a filter of the appliance→the air inlet chamber→the impeller chamber→the first outer chamber→the second outer chamber→an air outlet end. Under normal conditions, the bottom seal ring for flexible sealing is only subjected to axial pressure caused by the gravity of the motor, the motor seat, and the impeller, and the bottom seal ring 72 can maintain its own elasticity.

By detailing the bottom seal ring, the cross section of the bottom seal ring 72 is H-shaped or X-shaped. The seal ring with a regular cross section is easy to manufacture, so preferably, the bottom seal ring 72 is an inner and outer double-lip seal ring. More specifically, the bottom seal ring 72 includes a first lip 78, a second lip 80, a third lip 82, and a fourth lip 84, where the first lip 78 and the second lip 80 form a first directional lip opening 86 facing the motor seat, the second lip 80 and the third lip 82 form a third directional lip opening 90 facing the first outer chamber 45, the third lip 63 and the fourth lip 84 form a second directional lip opening 88 facing the isolating cover, and the first lip 78 and the fourth lip 84 form a fourth directional lip opening 92 opposite to the third directional lip opening, that is, the fourth directional lip opening 92 faces the air inlet chamber. When the pressure difference between the first outer chamber and the air inlet chamber increases, the third directional lip opening and/or the fourth directional lip opening are opened under the pressure to enhance the sealing effect.

Because the axial sealing between the motor seat and the isolating cover does not need compression, when the appliance is operating, the bottom seal ring can absorb the vibration of the motor, thereby ensuring the noise reduction effect while achieving the sealing effect. In particular, when the motor vibrates axially, the first directional lip opening and the second directional lip opening are opened under the pressure to enhance the sealing effect; when the motor vibrates radially, the four lips of the bottom seal ring are elastically deformed, and at least two upper and lower lips fit with the motor seat or the isolating cover more closely to ensure the sealing effect.

In addition, a groove 96 is provided on the top of the lower cover, and the groove can effectively limit the bottom seal ring 72 to prevent shifting.

Figure 8:
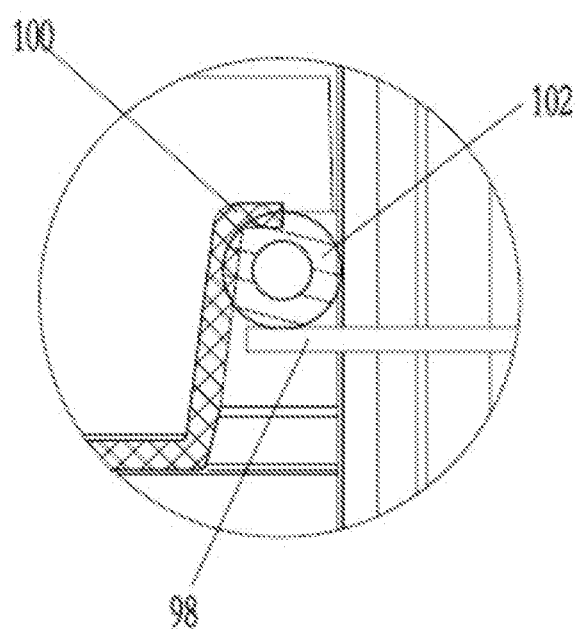
FIG. 8 is an enlarged cross-sectional view of area D in FIG. 2.

As an optimization scheme, as shown in FIG. 2 and FIG. 8, a protrusion 98 is provided on the periphery of the housing of the motor 32, the isolating cover includes an open end 100, the protrusion 98 is engaged with the open end along the axis of the motor 32, and a flexible gasket 102 is provided between the protrusion 98 and the open end 100. The flexible gasket 102 is used for fixing the motor and reducing vibration and noise. The position of the flexible gasket 102 is described in detail. The flexible gasket 102 is sandwiched above the protrusion 98 and below the open end to fix the motor axially. Above and below are for the directions of the appliance structure shown in FIG. 2. In conjunction with FIG. 2, the protrusion 98 is on the lower side of the flexible gasket 102, the motor housing is on the inner side, and the open end 100 is on the upper side and the outer side.

It should be noted that the upper part of the flexible gasket 102 communicates with the external air, the lower part of the flexible gasket 102 is the motor chamber 36, and the motor chamber also communicates with the external air. The vacuum cleaner is provided with a motor cooling air duct. When the motor is operating, cooling air enters the motor chamber from the upper part, and flows out of the motor chamber after cooling the motor. The flow direction of the cooling air is shown by arrows in FIG. 2. With the flexible gasket 102, the upstream and downstream of the motor cooling air duct can be air-tightly isolated, while the technical effects of vibration reduction and noise reduction are maintained.

In detail, the flexible gasket 102 is a non-circular gasket. The flexible gasket 102 is a polygonal gasket, and may also be oval or in other irregular shapes. Any shape capable of preventing follow-up rotation of the motor is within the protection scope of this case. In a preferred embodiment, the flexible gasket 102 is a rectangular gasket.

The protrusion 98 is provided with at least one lug in the radial direction of the motor. The lug cooperates with the open end and the flexible gasket to prevent follow-up rotation.

Preferably, the cross section of the flexible gasket 102 is circular, and may also be in other shapes, for example, X-shaped, H-shaped, etc., and the O-shaped cross section is easier to process. The cross section of the flexible gasket 102 is hollow O-shaped, and the hollow O-shaped cross section has better vibration reduction and noise reduction effects.

In the above embodiment, the first seal 40, the bottom seal ring 72, and the flexible gasket 102 are assembled by means of cooperation of their shapes and corresponding shapes of respective components of the vacuum cleaner, and are fixedly connected to the vacuum cleaner without the use of screws, bolts, buckles, adhesives, etc.

It can be found from the above description that the assembly structure of the present disclosure realizes the isolation of the motor chamber through the first seal, the first seal achieves sealing by a radial force, and its sealing performance is independent of the axial pressure of the motor, so the first seal does not lose its elasticity under large axial pressure and has strong noise absorption and noise reduction capability; the first seal of the assembly structure of the present disclosure has a first sealing portion and a second sealing portion and is of a lip-shaped structure, and its sealing effect is positively correlated to the air pressure in each outer chamber and adaptively adjusted according to the air pressure, so the first seal is not in a high pressure state for a long time, the elastic attenuation of the first seal is retarded, and the service life of the first seal is prolonged; the first seal of the assembly structure of the present disclosure has a third elastic portion, and the hollow column of the third elastic portion further increases the noise reduction performance; the assembly structure of the present disclosure also has a flexible gasket, which achieves the effects of vibration reduction, noise reduction and sealing; and the assembly structure of the present disclosure also has a bottom seal ring, which further enhances the sealing performance.

The dry and wet vacuum cleaner is taken as an example above to describe the technical solution disclosed in this preferred embodiment in detail. It should be noted that the packing and mounting mechanism provided by this preferred embodiment is also applicable various small and medium-sized appliances such as a water aspirator, a water pump, or a humidifier in which a motor is mounted as a power source and which uses liquid such as water during use.

Figure 9:
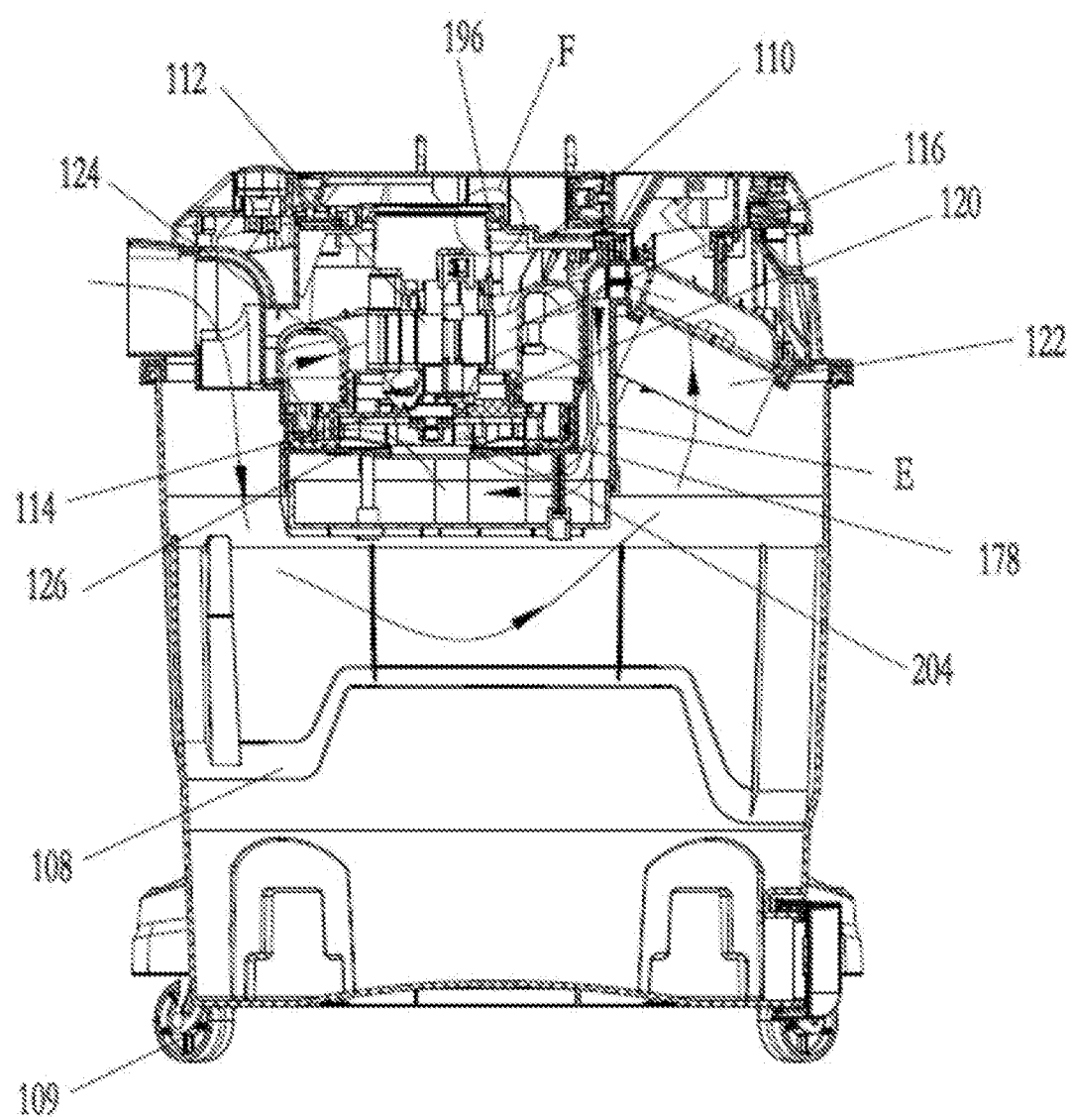
FIG. 9 is a side cross-sectional view of a wet and dry vacuum cleaner having a packing and mounting mechanism according to a second preferred embodiment of the present disclosure.
Figure 10:
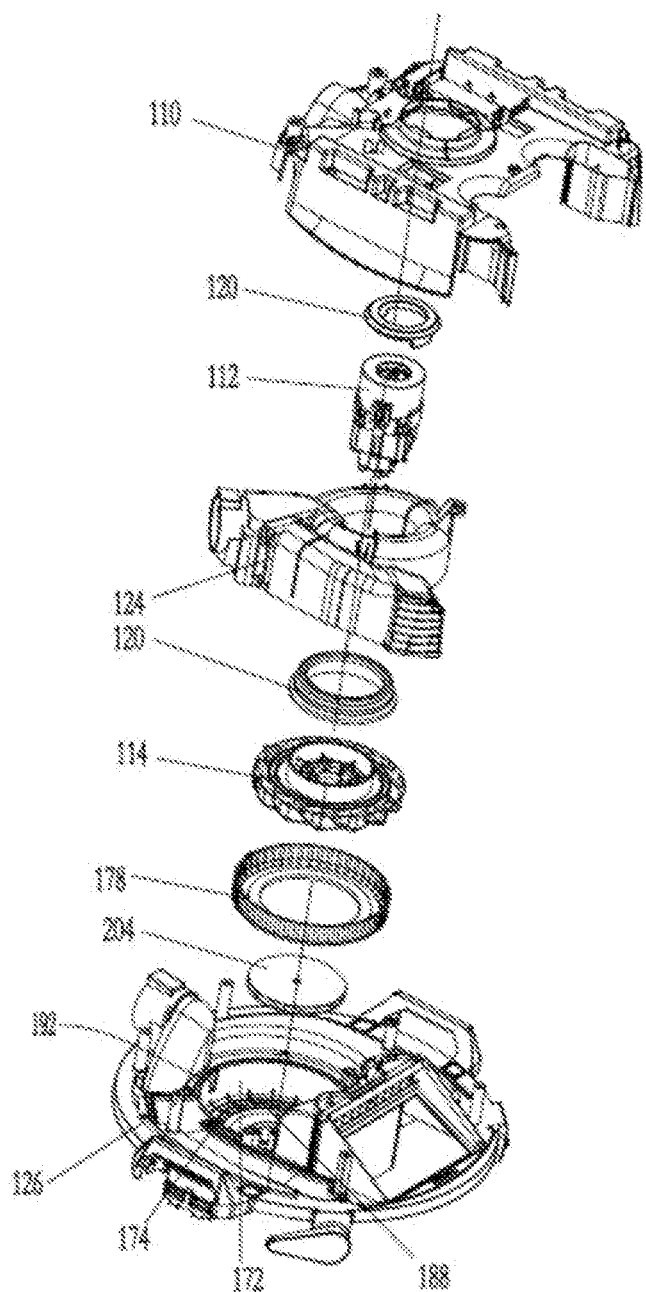
FIG. 10 is an exploded isometric view of the wet and dry vacuum cleaner having the packing and mounting mechanism according to the second preferred embodiment of the present disclosure, in which a dust cylinder and rollers are removed.

As shown in FIG. 9 and FIG. 10, a second preferred embodiment of the present disclosure is provided. In this preferred embodiment, as shown in FIG. 9 and FIG. 10, the vacuum cleaner includes a dust cylinder 108 and rollers 109 below the dust cylinder 108. The packing and mounting mechanism also includes a housing 110, a motor 112 in the housing 110, and a motor seat 114 supporting the motor 112. At least one isolating cover is provided inside the housing 110, and the motor 112 is axially disposed between the housing 110 and the motor seat 114. The motor seat 114, the housing 110, and the isolating cover collectively form a motor chamber 116 for receiving the motor 112. In addition, a sealed end of the motor chamber 116 has a radial mating clearance, and a radially-mated first seal 120 is provided in the mating clearance. The following describes the differences between this embodiment and the first embodiment in detail.

The packing and mounting mechanism further includes a filter 122, and the filter 122 may be a flat filter 122 or a ring filter 122 or other type of filter 122.

In this preferred embodiment, the first seal 120 also includes at least one sealing portion, and the sealing portion is a sealing mechanism having adaptive deformation according to the change in air pressure difference between the inside and outside of the motor chamber 116. The sealing portion is also a lip-shaped sealing portion. The sealing portion includes a main lip, a sub lip, and a lip opening formed by the main lip and the sub lip. In addition, the isolating cover and the motor seat 114 also form an outer chamber isolated from the motor chamber 116, and the sealing portion is adaptively deformed with the change in air pressure of the outer chamber.

Specifically, a first isolating cover 124 and a lower cover 126 are provided inside the housing 110, the first isolating cover 124 is disposed on the radial periphery of the motor 112, and the lower cover 126 is disposed on the lower part and radial periphery of the motor seat 114. A motor chamber 116 for receiving the motor 112 is formed among the housing 110, the motor seat 114 and the first isolating cover 124, the sealed end of the motor chamber 116 has a radial mating clearance, and a radially-mated first seal 120 is disposed in the mating clearance. Specifically, in this embodiment, the sealed end refers to a joint between the motor seat 114 and the first isolating cover 124, so as to realize sealed docking. The first seal 120 is elastically deformed by a radial force for sealing, and its sealing performance is independent of the axial pressure of the motor 112, so the first seal 40 does not lose its elasticity under large axial pressure, and has strong noise absorption and noise reduction capability.

An outer chamber is formed among the motor seat 114, the first isolating cover 124, and the lower cover 126, and the sealing portion is adaptively deformed with the change in air pressure of the outer chamber. Further, a radial mating clearance is formed between the motor seat 114 and the first isolating cover 124, and the first seal 120 includes a first sealing portion 130 in the radial mating clearance. The motor chamber 116 is isolated from the outer chamber by the first sealing portion 130 to prevent water from entering the motor chamber 116 along the matching clearance, thereby effectively protecting the motor 112 and its accessories.

Further, an axial mating clearance is also formed between the motor seat 114 and the first isolating cover 124, and the first seal 120 is also in the axial mating clearance. Specifically, the first seal 120 further includes a second sealing portion 134 in the axial mating clearance. In this preferred embodiment, the first sealing portion 130 and the second sealing portion 134 are integrally provided, and both the first sealing portion and the second sealing portion are at least partially exposed from the motor chamber. The second sealing portion 134 is at least partially exposed from the outer chamber formed by the motor seat 114, the first isolating cover 124, and the lower cover 126. Therefore, the first seal 120 can be adaptively deformed with the change in air pressure of the outer chamber. Of course, the first sealing portion 130 and the second sealing portion 134 may also be provided separately. Specifically, the first sealing portion 130 plays a main sealing role, the second sealing portion 134 plays a supporting role, and the second sealing portion 134 also plays a certain sealing role.

Figure 11:
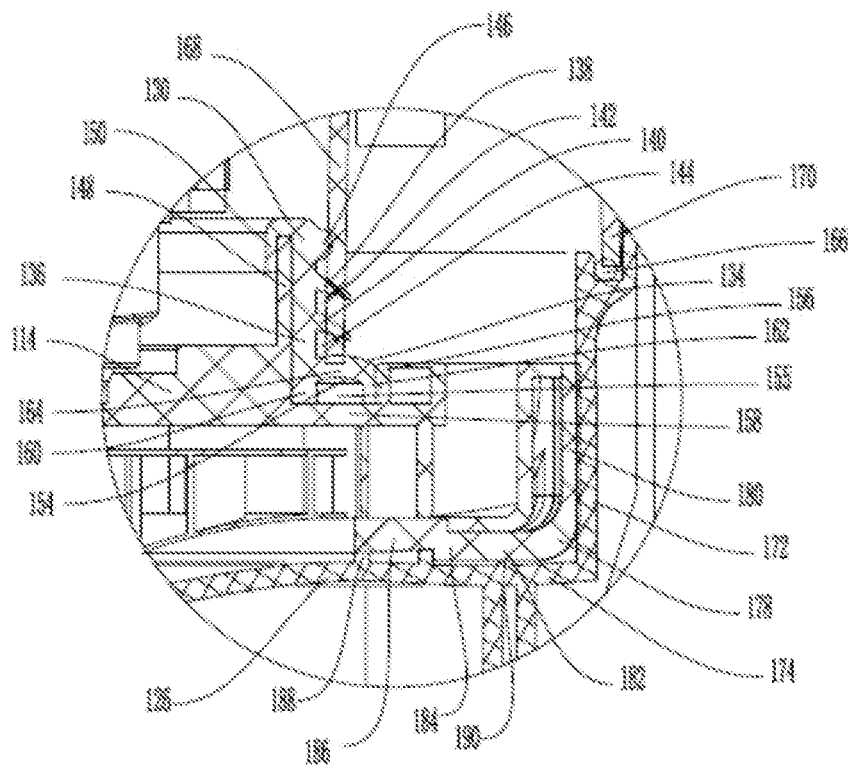
FIG. 11 is an enlarged cross-sectional view of area E in FIG. 9.
Figure 12:
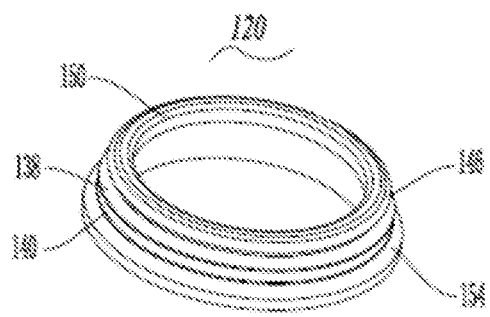
FIG. 12 is an isometric view of the first seal in FIG. 9.
Figure 13:
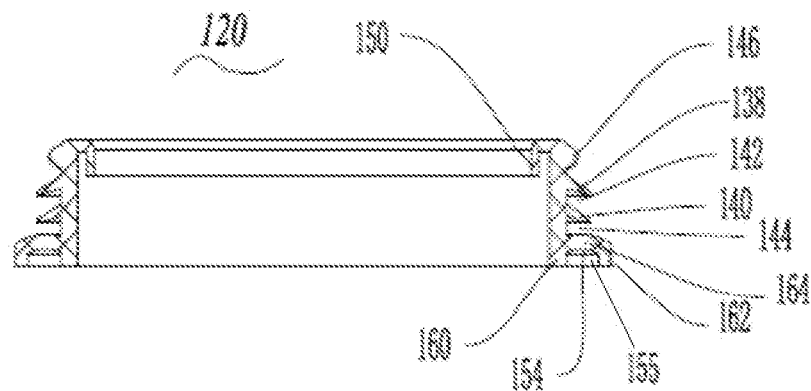
FIG. 13 is a side cross-sectional view of the first seal in FIG. 12.

Further referring to FIG. 11, FIG. 12, and FIG. 13, the first sealing portion 130 includes a main lip 136 and a sub lip, a lip opening is formed between the main lip 136 and the sub lip, and the lip opening faces the second sealing portion 134.

Further, the lip opening faces the outer chamber, and the open direction of the lip opening faces away from the motor chamber. Specifically, the first sealing portion 130 includes a first sub lip 138 and a second sub lip 140, the main lip 136 and the first sub lip 138 form a first lip opening 142, the main lip 136 and the second sub lip 140 form a second lip opening 144, and both the first lip opening 142 and the second lip opening 144 face the second sealing portion 134.

Further, the main lip 136 extends longitudinally along the axis of the motor 112, the main lip 136 abuts against the periphery of the motor seat 114, and the sub lips abut against the first isolating cover 124. The main lip 136 is spaced a certain distance from the first isolating cover 124.

The first sealing portion 130 further includes a raised portion 146 extending from the main lip 136, the raised portion 146 and the sub lips are on the same side of the main lip 136, and the raised portion 146 abuts against the first isolating cover 124. In addition, the raised portion 146 and the second sealing portion 134 are on two sides of the sub lips.

The motor seat 114 has an inner flange 148, and the first sealing portion 130 has an inversion portion 150 connected to the main lip 136 and having a certain distance from the main lip 136. The inversion portion 150 is snapped on the inner flange 148 of the motor seat 114 to fix the motor seat 114 and the first seal 120, enhance the fit between the main lip 136 and the inner flange 148, and further improve the sealing effect on the motor chamber 116.

Figure 19:
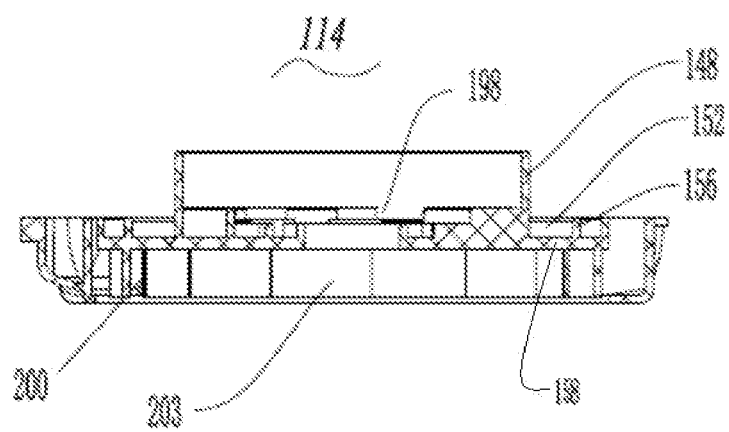
FIG. 19 is a side cross-sectional view of the motor seat in FIG. 17.
Figure 20:
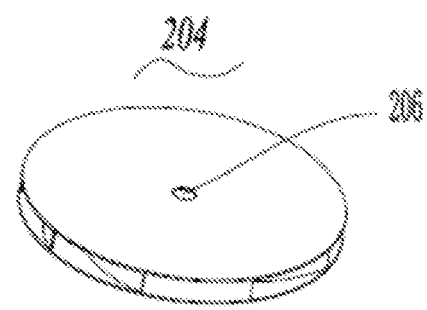
FIG. 20 is an isometric view of the dynamic impeller in FIG. 9.
Figure 21:
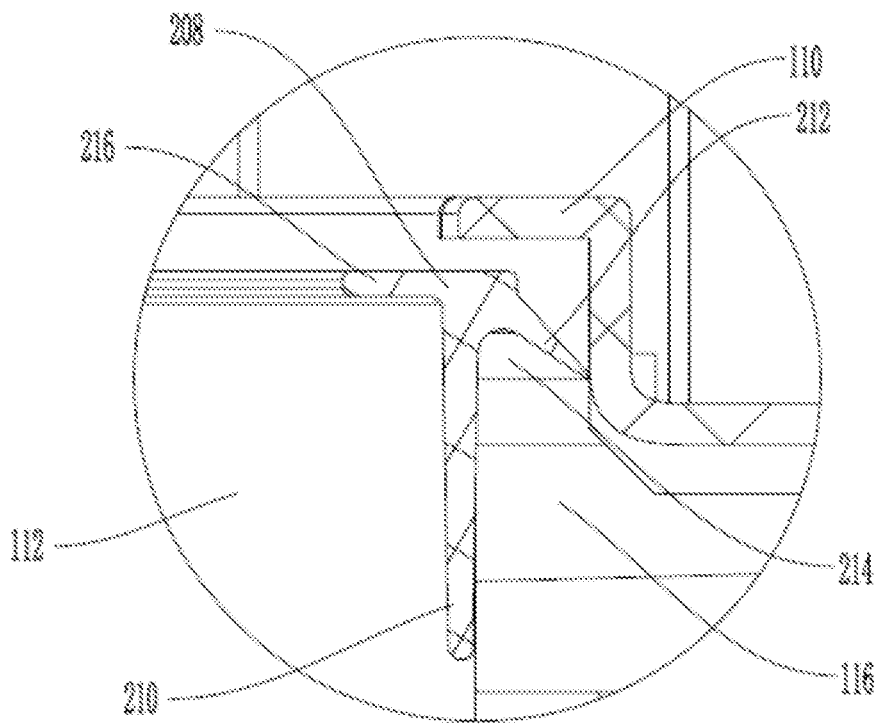
FIG. 21 is an enlarged cross-sectional view of area F in FIG. 9.
Figure 22:
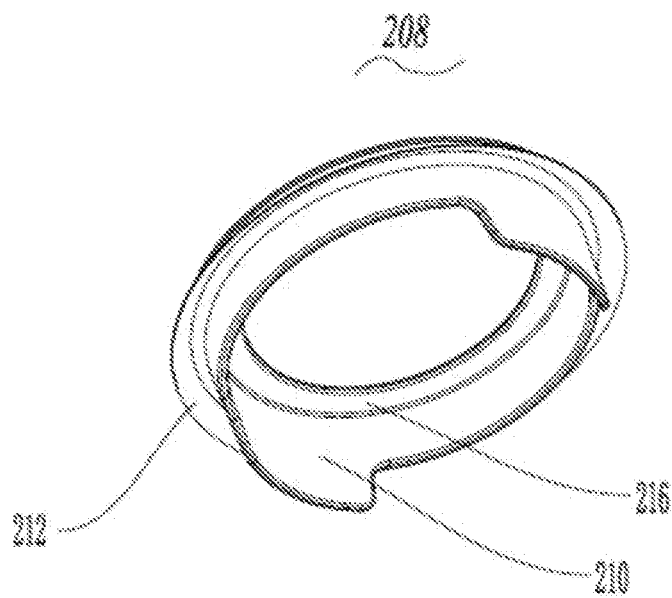
FIG. 22 is an isometric view of the third seal in FIG. 9.
Figure 23:
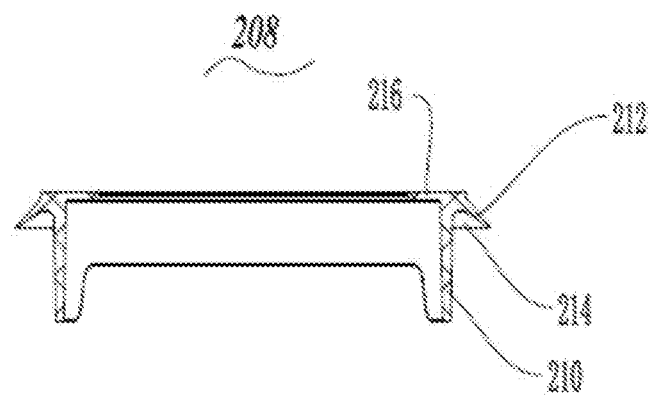
FIG. 23 is a side cross-sectional view of the third seal in FIG. 22.

The motor seat 114 is provided with a mounting groove 152 (see FIG. 19), and the first seal 120 is disposed in the mounting groove 152. Specifically, the second sealing portion 134 is disposed in the mounting groove 152. The first seal 120 has an elastic supporting portion 154. In this embodiment, the cross section of the elastic supporting portion 154 is substantially of a door-shaped structure, and the elastic supporting portion 154 has an opening 155 facing the axial direction of the motor 112. In other embodiments, the cross section of the elastic supporting portion may also be circular, polygonal or in other shape, and more preferably, the cross section is of a hollow structure, as long as the elastic supporting portion can play a supporting role and have elasticity. Specifically, the elastic supporting portion 154 is disposed on the second sealing portion 134, and the opening 155 of the elastic supporting portion 154 faces downward. In addition, the motor seat 114 further includes an outer flange 156 opposite to the inner flange 148 and a bottom portion 158 between the inner flange 148 and the outer flange 156. The inner flange 148, the bottom portion 158, and the outer flange 156 define the mounting groove 152, and the opening 155 of the elastic supporting portion 154 faces the bottom portion 158 (see FIG. 11).

The second sealing portion 134 has an inner side wall 160, an outer side wall 162 opposite to the inner side wall 160 and having a certain distance from the inner side wall 160, and a top wall 164 for connecting the inner side wall 160 and the outer side wall 162. The inner side wall 160, the outer side wall 162, and the top wall 164 constitute the door-shaped portion 154 having an opening. The inner side wall 160 has the same thickness as the main lip 136 of the first sealing portion 130, and the both extend along the axis of the motor 112. The inner side wall 160 abuts against the inner flange 148 of the motor seat 114, the outer side wall 162 abuts against the outer flange 156 of the motor seat 114, the top wall 164 has a radian away from the opening and abuts against the isolating cover, and specifically, the top wall 164 abuts against the first isolating cover 124.

Figure 14:
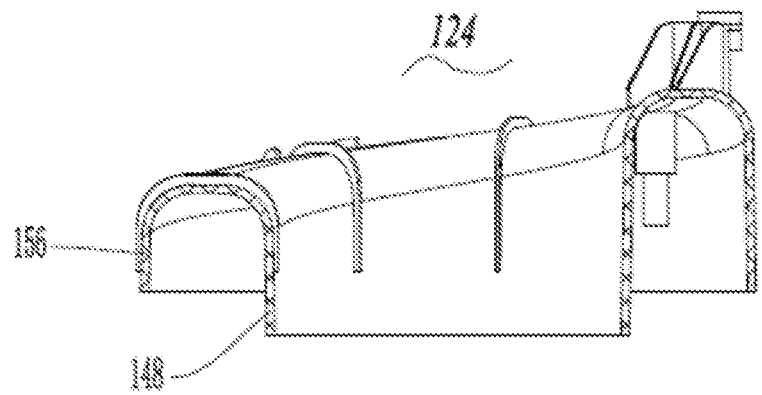
FIG. 14 is a partial cross-sectional view of the first isolating cover in FIG. 9.

Further referring to FIG. 11 and FIG. 14, a sealing gasket 166 is provided between the first isolating cover 124 and the lower cover 126, the first isolating cover 124 has a first isolating cover inner edge 168 and a first isolating cover outer edge 170, the lower cover 126 has a peripheral portion 172 on the periphery of the motor seat 114 and an end portion 174 on the axial end face of the motor seat 114, the peripheral portion 172 is provided with a receiving groove for receiving the sealing gasket 166, and the first isolating cover outer edge 170 is in the receiving groove and abuts against the sealing gasket 166. Further, the cross section of the sealing gasket 166 is 0-shaped. Of course, the cross section of the sealing gasket 166 may also be in other shape, such as X-shaped, H-shaped, etc. The O-shaped cross section is easier to process. The cross section of the sealing gasket 166 is hollow O-shaped, and the hollow O-shaped cross section has better vibration reduction and noise reduction effects.

The first sealing portion 130 is between the motor seat 114 and the first isolating cover inner edge 168. Specifically, the first sealing portion 130 is between the inner flange 148 of the motor seat 114 and the first isolating cover inner edge 168. The main lip 136 abuts against the inner flange 148 of the motor seat 114, and the sub lips abut against the first isolating cover inner edge 168.

Figure 15:
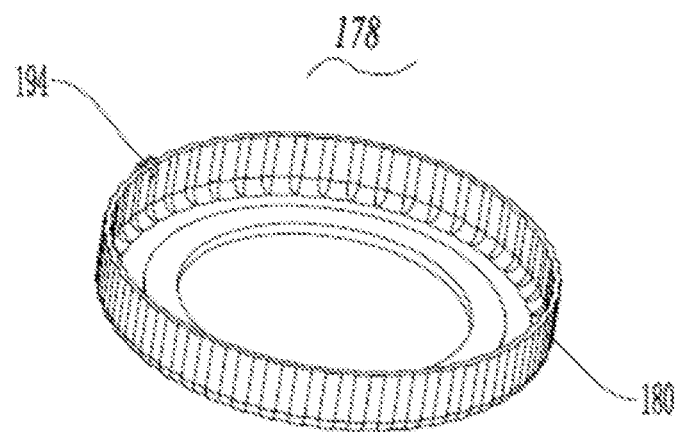
FIG. 15 is an isometric view of the second seal in FIG. 9.
Figure 16:
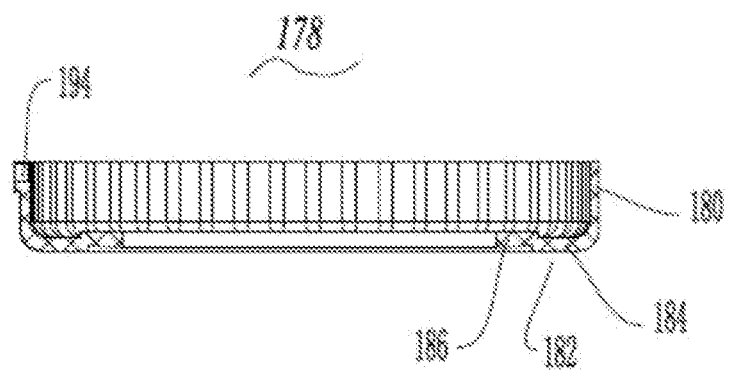
FIG. 16 is a side cross-sectional view of the second seal in FIG. 15.
Figure 17:
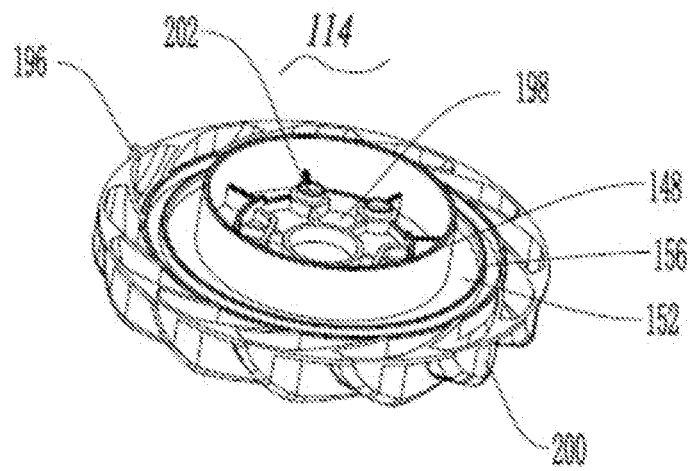
FIG. 17 is an isometric view of the motor seat in FIG. 9.
Figure 18:
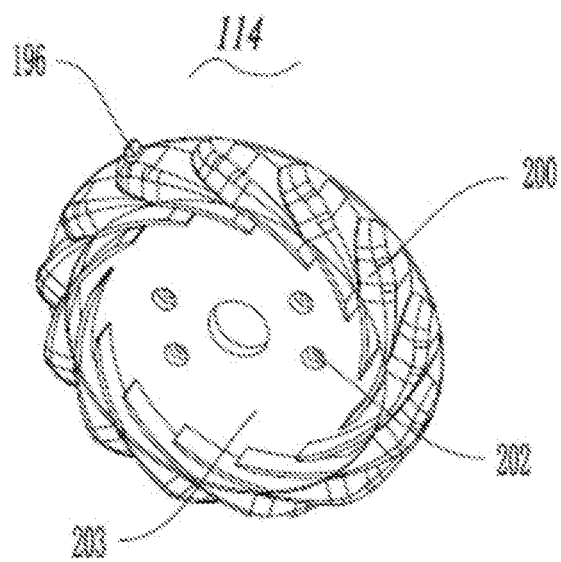
FIG. 18 is an isometric view of the motor seat in FIG. 17 from another direction.

With further reference to FIG. 11, FIG. 15 and FIG. 16, a second seal 178 is provided between the motor seat 114 and the lower cover 126, the second seal 178 has a seal side wall 180 and a bottom wall 182, the seal side wall 180 is disposed on the periphery of the motor seat 114, the seal side wall 180 is between the motor seat 114 and the peripheral portion 172 of the lower cover 126, and the bottom wall 182 is between the end face of the motor seat 114 and the end portion 174 of the lower cover 126.

Further, the seal side wall 180 is corrugated. The bottom wall 182 has a bottom edge 184 connected to the side wall and an inner edge 186 connected to the bottom edge 184. The seal side wall 180 has a connecting end connected to the bottom edge 184 and a free end opposite to the connection end. In the vertical direction, the inner edge 186 is closer to the free end than the bottom edge 184, that is, the inner edge 186 is recessed inward for a certain distance. In this way, a margin is provided for the squeezing between the motor seat 114 and the lower cover 126 to prevent the second seal 178 from being crushed. Of course, the bottom wall 182 of the second seal 178 may also be of other vibration reduction structure, such as a hollow structure or a corrugated structure.

The inner edge 186 extends obliquely from the connection point with the bottom edge 184 toward the end portion 174 of the lower cover 126. The end portion 174 of the lower cover 126 is provided with at least one abutting portion 188 abutting against the inner edge 186. In this preferred embodiment, two abutting portions 188 are provided at interval. In addition, the end portion 174 of the lower cover 126 is also provided with a protruding portion 190 abutting against the bottom edge 184, the protruding portion 190 of a second isolating portion abuts against the bottom edge 184, and other portion of the end portion 174 except the protruding portion 190 has a certain distance from the bottom edge 184, so that a certain margin can be provided for the squeezing between the motor seat 114 and the lower cover 126 to further prevent the second seal 178 from being crushed.

In this preferred embodiment, referring further to FIGS. 10 and 15 to 19, the packing and mounting mechanism for the motor 112 in the small or medium-sized appliance further includes a follow-up rotation preventing structure, thereby preventing other parts of the motor 112 except a rotor, the motor seat 114, and the second seal 178 from rotating, that is, the motor 112, the motor seat 114, and the second seal 178 do not follow the rotor of the motor 112 to rotate, and the relative positions of the motor 112, the motor seat 114, and the second seal 178 in the circumferential direction remain unchanged. The follow-up rotation preventing structure includes a first mating portion 192 disposed on the lower cover 126, a second mating portion 194 disposed on the second seal 178, and a third mating portion 196 disposed on the motor seat 114. Every two of the mating portion 192, the second mating portion 194, and the third mating portion 196 are mated with each other, thereby limiting mutual circumferential rotation among the motor 112, the motor seat 114, and the second seal 178. Specifically, the first mating portion 192 is a positioning groove, the second mating portion 194 is a positioning protrusion with a straight positioning convex slot, and the third mating portion 196 is a fixed protrusion extending toward the periphery of the motor seat 114, the fixed protrusion being mated with the positioning convex slot, the positioning protrusion being mated with the positioning groove. Of course, the first mating portion 192 may also be provided as a positioning groove, the second mating portion 194 is provided as a straight slot, and the third mating portion 196 is provided as a fixed protrusion, the fixed protrusion penetrating the straight slot and being mated with the straight slot and the positioning groove.

The motor is disposed on a first side of the motor seat 114, and a dynamic impeller is disposed on a second side of the motor seat opposite to the first side. Specifically, the motor seat 114 has a mounting portion 198, the motor 112 is disposed on a first side of the mounting portion 198, a static impeller 200 is disposed on a second side of the mounting portion 198 opposite to the first side, the mounting portion 198 is provided with a plurality of screw holes 202 for fixing the motor 112, and the inner flange 148 of the motor seat 114 is disposed on the mounting portion 198 and located on the periphery of the motor 112.

Further referring to FIGS. 10, 17, 18, and 20, the motor 112 has an output shaft, a dynamic impeller 204 is disposed on the output shaft, and the static impeller 200 is on the periphery of the dynamic impeller 204. The motor seat 114 may be used as an open diffuser to diffuse the wind generated by the dynamic impeller 204 to the air duct. Furthermore, the static impeller 200 surrounds a receiving cavity 203, and the dynamic impeller 204 is in the receiving cavity 203. Since the static impeller 200 is on the periphery of the dynamic impeller 204, the dynamic impeller 204 is prevented from being thrown out. The dynamic impeller 204 is provided with a fixing hole 206, and the dynamic impeller 204 is detachably disposed on the output shaft of the motor 112 through the fixing hole 206.

In this preferred embodiment, the assembling method of the dynamic impeller 204 and the motor 112 is: the motor 112 is first fixed to the mounting portion 198 of the motor seat 114 by screws, then the dynamic impeller 204 is placed in the receiving cavity 203 surrounded by the static impeller 200, and the dynamic impeller 204 is mounted on the output shaft of the motor 112.

Further referring to FIGS. 10 and 21 to 23, a third seal 208 is provided between the housing 110 and the motor 112, the third seal 208 has a vertical edge 210 and at least one lip edge 212 disposed at an angle to the vertical edge 210, the lip edge 212 and the vertical edge 210 form a third lip opening 214, the vertical edge 210 is disposed on the periphery of the motor 112 and abuts against the periphery of the motor 112, the lip edge 212 abuts against the housing 110, and the third lip opening 214 faces the motor chamber 116.

The third seal 208 also has a transverse edge 216 disposed at an angle to the vertical edge 210, the transverse edge 216 and the lip edge 212 are on two sides of the vertical edge 210 respectively, and the transverse edge 216 abuts against an end of the motor 112.

It should be understood that, although the Description is given according to the embodiments, but each embodiment does not include only one independent technical solution, this narrative manner of the Description is only for clarity, the Description shall be regarded as a whole for a person skilled in the art, and the technical solutions in the embodiments may also be properly combined to form other implementations that can be understood by the person skilled in the art.

A series of detailed descriptions set forth above are merely specific descriptions directed to the feasible embodiments of the present disclosure, and they are not intended to limit the scope of protection of the present disclosure. Any equivalent embodiment or alteration made without departing from the spirit of the present disclosure shall be included within the scope of protection of the present disclosure.

The invention claimed is:

1. A packing and mounting mechanism for a motor in an electrical appliance, comprising:
  a housing;
  a motor in the housing;
  a motor seat supporting the motor, the motor being axially disposed between the housing and the motor seat;
  at least one isolating cover located inside the housing;
  a motor chamber for receiving the motor being defined among the housing, the motor seat, and the isolating cover;
  an axial mating clearance defined between the isolating cover and the motor seat; and
  a first seal located and axially-mated in the axial mating clearance, the first seal having an elastic supporting portion, the elastic supporting portion defining an opening facing an axial direction of the motor;
  wherein the at least one isolating cover includes a first isolating cover, the first isolating cover and a lower cover being located inside the housing, the first isolating cover being disposed on a radial periphery of the motor, the lower cover being disposed on a lower part and a radial periphery of the motor seat, the motor chamber being formed among the housing, the motor seat, and the first isolating cover, an outer chamber isolated from the motor chamber being formed among the motor seat, the first isolating cover, and the lower cover, the axial mating clearance being located between the first isolating cover and the motor seat; and
  wherein a radial mating clearance is formed between the first isolating cover and the motor seat, the first seal includes a first sealing portion in the radial mating clearance and a second sealing portion in the axial mating clearance, the elastic supporting portion being disposed on the second sealing portion.

2. The packing and mounting mechanism for the motor in the electrical appliance according to claim 1, wherein the second sealing portion is at least partially exposed to the motor chamber, the first sealing portion including a sealing mechanism having adaptive deformation according to the change in air pressure of the outer chamber.

3. The packing and mounting mechanism for the motor in the electrical appliance according to claim 1, wherein the first sealing portion is a lip-shaped sealing portion.

4. The packing and mounting mechanism for the motor in the electrical appliance according to claim 1, wherein a sealing gasket is located between the first isolating cover and the lower cover, the first isolating cover having a first isolating cover inner edge and a first isolating cover outer edge, the lower cover having a peripheral portion on a periphery of the motor seat and an end portion on an axial end face of the motor seat, the peripheral portion defining a receiving groove for receiving the sealing gasket, the first isolating cover outer edge abutting the sealing gasket.

5. The packing and mounting mechanism for the motor in the electrical appliance according to claim 1, wherein a third seal is located between the housing and the motor, the third seal having a vertical edge and at least one lip edge disposed at an angle to the vertical edge, the lip edge and the vertical edge forming a third lip opening, the vertical edge being disposed on and abutting a periphery of the motor, the lip edge abutting the housing, the third lip opening facing the motor chamber.

6. The packing and mounting mechanism for the motor in the electrical appliance according to claim 1, wherein the motor seat has a mounting portion, the mounting portion having a first side and a second side opposite the first side, the motor being disposed on the first side, a static impeller being disposed on the second side, the motor having an output shaft, a dynamic impeller being disposed on the output shaft, the static impeller being on a periphery of the dynamic impeller.

7. The packing and mounting mechanism for the motor in the electrical appliance according to claim 1, wherein the no larger than medium-sized appliance is one of a wet and dry vacuum cleaner, a water aspirator, a water pump, or a humidifier.

8. The packing and mounting mechanism for the motor in the electrical appliance according to claim 1, wherein a second seal is located between the isolating cover and the motor seat; and
further including a follow-up rotation preventing structure for preventing other parts of the motor except a rotor, the motor seat, and the second seal from rotating;
the follow-up rotation preventing structure including a first mating portion disposed on the isolating cover, a second mating portion disposed on the second seal, and a third mating portion disposed on the motor seat, wherein every two of the mating portion, the second mating portion, and the third mating portion are mated with each other.

9. The packing and mounting mechanism for the motor in the electrical appliance according to claim 8, wherein the first mating portion defines a positioning groove, the second mating portion is a positioning protrusion with a straight positioning convex slot, and the third mating portion is a fixed protrusion extending toward a periphery of the motor seat, the fixed protrusion being mated with the positioning convex slot, the positioning protrusion being mated with the positioning groove.

10. The packing and mounting mechanism for the motor in the electrical appliance according to claim 1, wherein the first seal has an inner side wall, an outer side wall opposite the inner side wall and at a certain distance from the inner side wall, and a top wall for connecting the inner side wall and the outer side wall; the inner side wall, the outer side wall, and the top wall together defining an opening.

11. The packing and mounting mechanism for the motor in the electrical appliance according to claim 10, wherein the top wall has a portion extending radially away from the opening.

12. The packing and mounting mechanism for the motor in the electrical appliance according to claim 10, wherein the motor seat defines a mounting groove, the first seal being disposed in the mounting groove, the motor seat further including an inner flange, an outer flange opposite the inner flange, and a bottom portion between the inner flange and the outer flange; the inner flange, the bottom portion and the outer flange defining the mounting groove, the opening of the elastic supporting portion facing the bottom portion, the inner side wall abutting the inner flange, the outer side wall abutting the outer flange, and the top wall abutting the isolating cover.

13. The packing and mounting mechanism for the motor in the electrical appliance according to claim 1, wherein a second seal is located between the motor seat and the lower cover, the second seal has a seal side wall and a bottom wall, the seal side wall being disposed on a periphery of the motor seat, the seal side wall being located between the motor seat and a peripheral portion of the lower cover, and the bottom wall being located between an end face of the motor seat and an end portion of the lower cover.

14. The packing and mounting mechanism for the motor in the electrical appliance according to claim 13, wherein the seal side wall is corrugated, the bottom wall having a bottom edge connected to the side wall and an inner edge connected to the bottom edge, the seal side wall having a connecting end connected to the bottom edge and a free end opposite the connection end, the inner edge being closer in a vertical direction to the free end than the bottom edge.

15. The packing and mounting mechanism for the motor in the electrical appliance according to claim 14, wherein the inner edge extends obliquely from a connection point with the bottom edge toward a direction of an end portion of a second isolating cover, the end portion of the second isolating cover having at least one abutting portion abutting the inner edge, the end portion of the second isolating cover also having a protruding portion abutting the bottom edge, a part of the end portion of the second isolating cover spaced from the protruding portion being a certain distance from the bottom edge.

* * * * *